United States Patent [19]
Egan

[11] Patent Number: 6,003,830
[45] Date of Patent: Dec. 21, 1999

[54] PORTABLE ENGINE STAND FOR MOTORCYCLE ENGINES

[76] Inventor: Roger Egan, 1567-A Almaden Rd., San Jose, Calif. 95125

[21] Appl. No.: 09/074,482

[22] Filed: May 6, 1998

[51] Int. Cl.⁶ ..................................................... F16M 1/00
[52] U.S. Cl. .......................... 248/676; 248/670; 248/671; 248/129; 269/17
[58] Field of Search .................................... 248/637, 671, 248/676, 674, 675, 678, 129, 544; 269/16, 17, 56, 22

[56] References Cited

U.S. PATENT DOCUMENTS

| | | | |
|---|---|---|---|
| 1,464,065 | 8/1923 | Dickover et al. ........................ | 29/89.5 |
| 4,511,112 | 4/1985 | Ruehle ..................................... | 248/544 |
| 4,848,717 | 7/1989 | Bevill ...................................... | 248/670 |
| 4,932,628 | 6/1990 | Pacheco .................................. | 248/676 |
| 5,383,652 | 1/1995 | Van Den Berg .......................... | 269/17 |
| 5,851,007 | 12/1998 | Swartzlander et al. ................... | 269/17 |

*Primary Examiner*—Derek J. Berger
*Assistant Examiner*—Gwendolyn Baxter
*Attorney, Agent, or Firm*—The Kline Law Firm

[57] ABSTRACT

A portable engine stand for a motorcycle engine that is particularly adapted for Harley Davidson V-twin engines. The stand includes a frame to support the engine. The frame is mounted on wheels and includes a pull handle for easy portability. A starter mechanism and a battery compartment are also supplied on the stand. Fuel and oil supplies are also provided, so that the engine can be started and operated under normal conditions while mounted on the engine stand.

12 Claims, 5 Drawing Sheets

PORTABLE ENGINE STAND FOR MOTORCYCLE ENGINES

FIELD OF THE INVENTION

The present invention relates generally to engine stands, and more particularly is a portable engine stand for V-twin motorcycle engines.

BACKGROUND OF THE INVENTION

One of the most difficult problems in repairing or modifying engines is gaining access to the various components of the engine. Typically, people working on motorcycle engines simply leave the engines mounted in the motorcycle frame. This is necessary to be able to start and operate the engine for testing. This method forces the mechanic to work in an uncomfortable position, and inhibits access to many parts of the engine.

To overcome these difficulties, the engine may have to be removed from the motorcycle frame. In this case, the engine is then generally simply laid on a bench, where it is subject to undesired movement when sufficient force is applied. The engine may be bolted into a small stationary mounting frame to overcome this drawback, but there is then no means available to test the engine. In order to start and operate the engine, it has to be reinstalled into the motorcycle frame. Clearly this can be a serious shortcoming if numerous tests are required.

Accordingly, it is an object of the present invention to provide an engine stand that provides easy access to a motorcycle engine.

It is a further object of the present invention to provide a starter mechanism so that the engine can be started while still mounted in the stand.

It is a still further object of the present invention to provide an engine stand that provides a means of fuel and lubricant supply, so that the engine can be operated in the stand.

It is yet another object of the present invention to provide a stand that allows portability of the engine.

SUMMARY OF THE INVENTION

The present invention is a portable engine stand for a motorcycle engine, and in one preferred embodiment, is particularly adapted for Harley Davidson V-twin engines. The stand includes a frame to support the engine. The frame is mounted on wheels and includes a pull handle for easy portability. A starter mechanism and a battery compartment are also supplied on the stand. Fuel and oil supplies are also provided, so that the engine can be started and operated under normal conditions while mounted on the engine stand.

An advantage of the present invention is that the engine to be worked on can be mounted for easy accessibility, and can be moved to any location desired by the user.

Another advantage of the present invention is that it provides a means to start and operate the engine while the engine is mounted in the stand.

A still further advantage of the present invention is that

These and other objects and advantages of the present invention will become apparent to those skilled in the art in view of the description of the best presently known mode of carrying out the invention as described herein and as illustrated in the drawings.

DETAILED DESCRIPTION OF THE INVENTION

Figure 1:
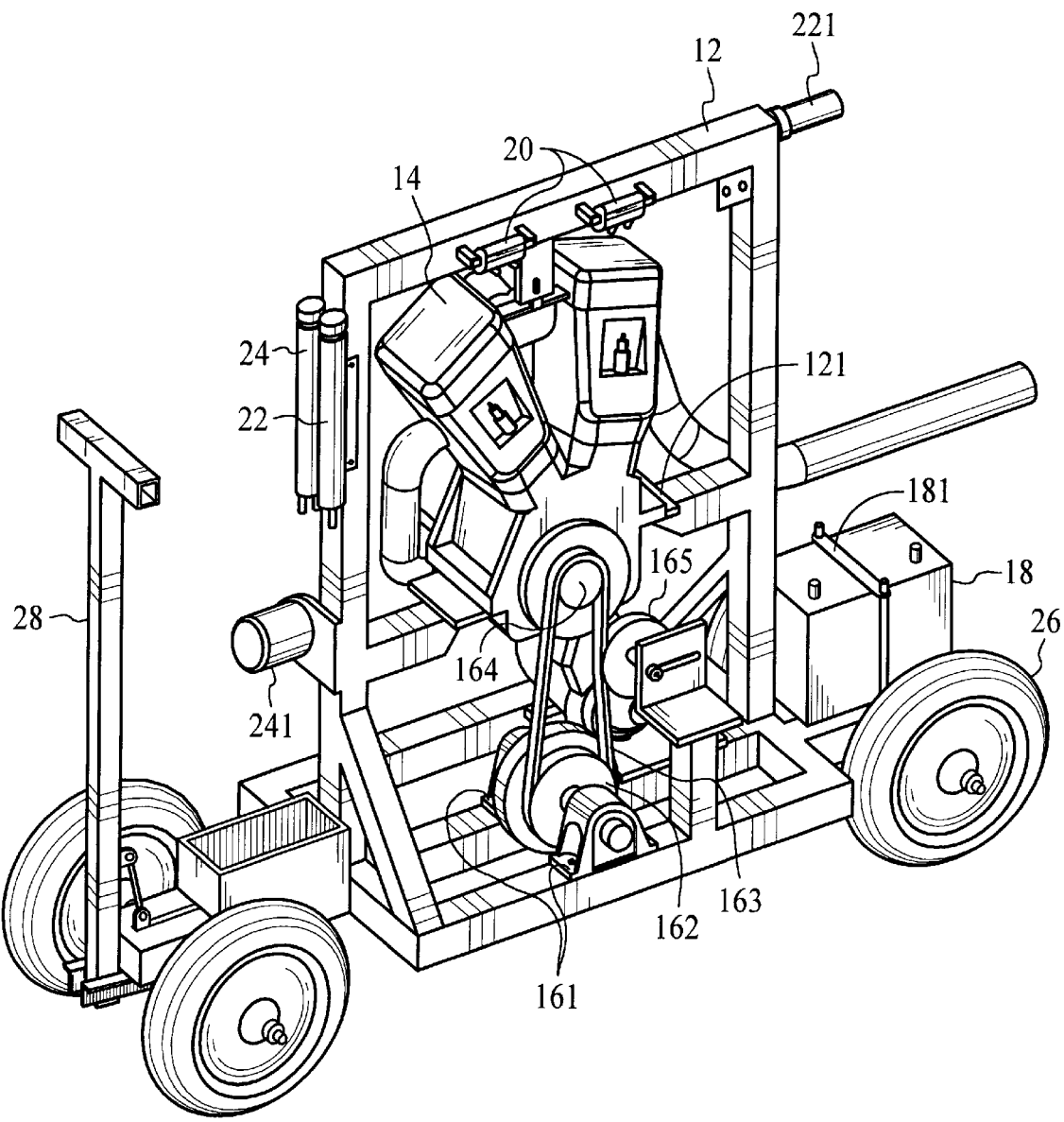
FIG. 1 is a left side perspective view of the portable engine stand of the present invention with an engine mounted in the stand.
Figure 2:
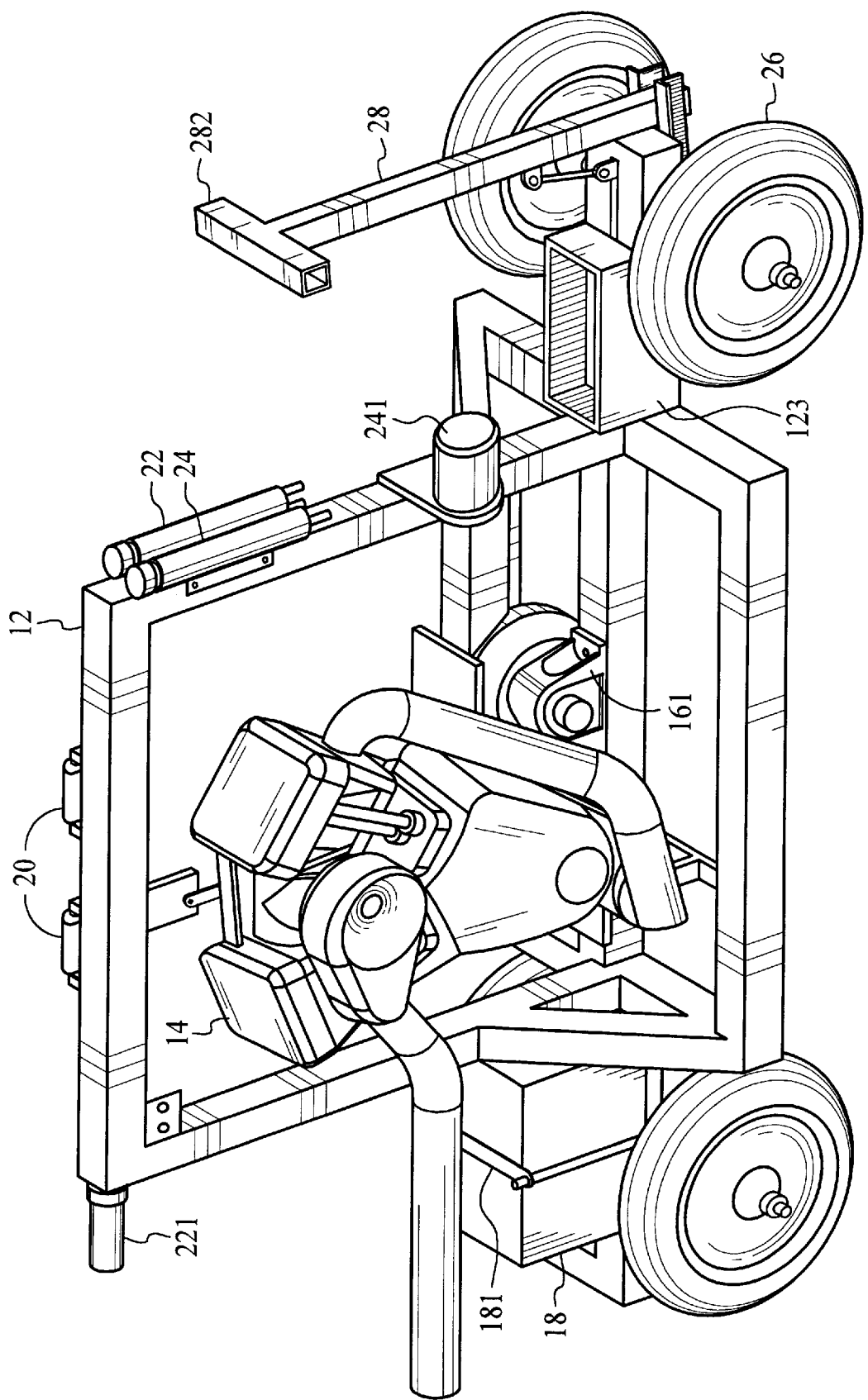
FIG. 2 is a right side elevation view of the portable engine stand of the present invention with an engine mounted in the stand.
Figure 3:
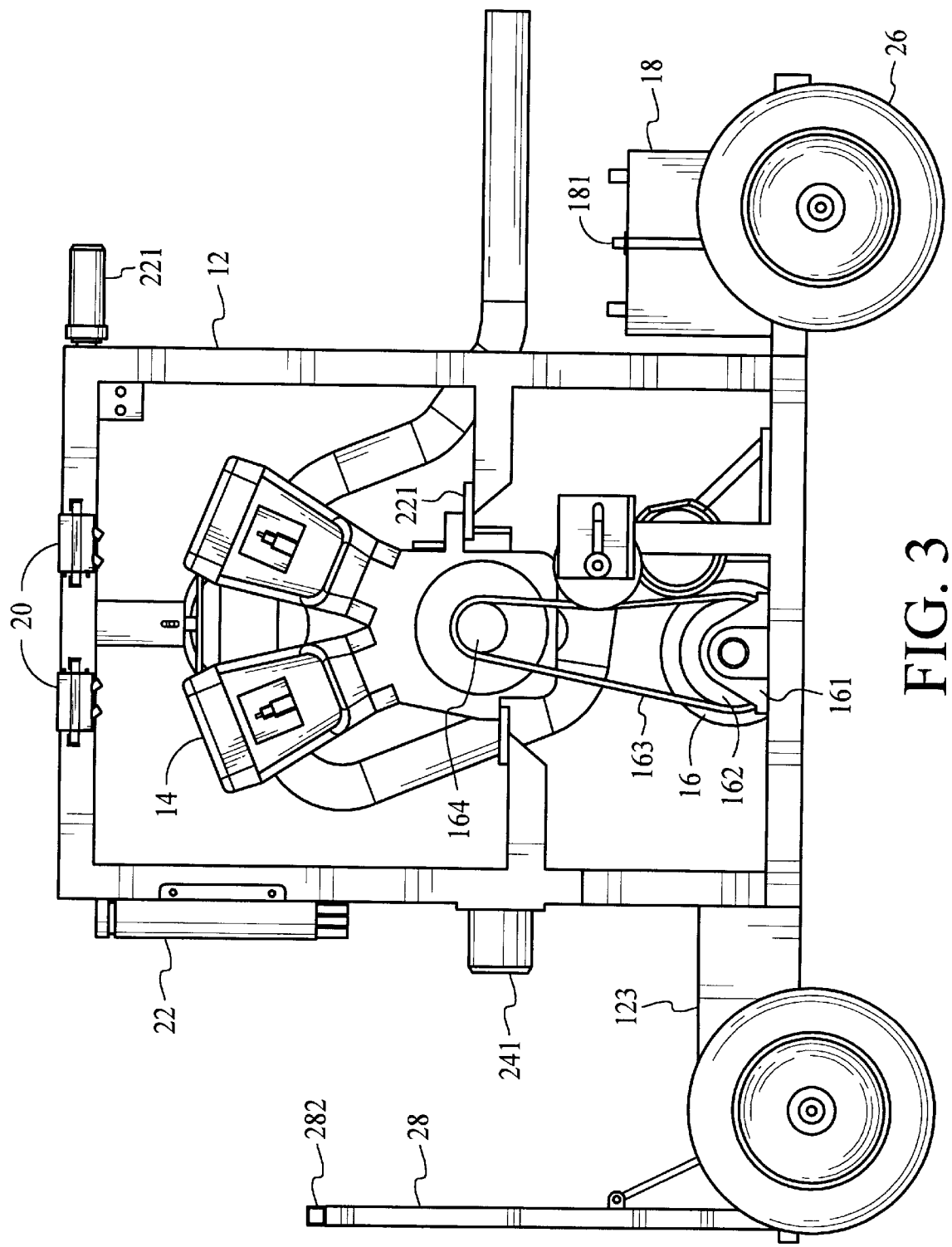
FIG. 3 is a left side view of the stand and engine.
Figure 4:
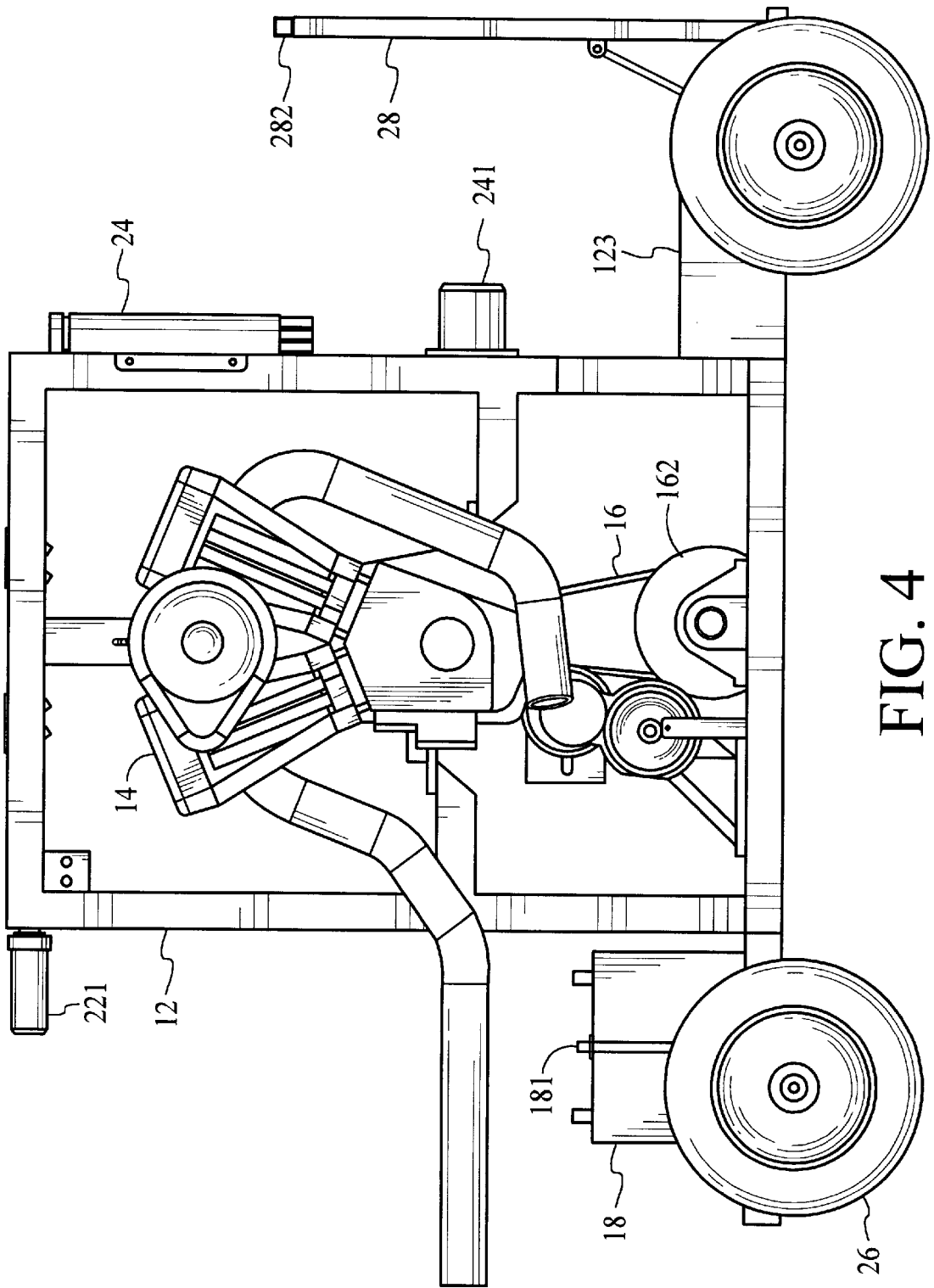
FIG. 4 is a right side view of the stand and engine.

The present invention is a portable engine stand 10 adapted to support a motorcycle engine 14. The preferred embodiment is constructed to specifically conform to the dimensions and geometry of Harley Davidson V-twin engines, but can be easily adapted to accommodate other engines.

The stand 10 comprises a frame 12 that directly supports the engine 14. The frame 12 includes at least two engine mounts 121. These mounts 121 are positioned to receive the engine block of the engine to be worked on. The mounts 121 include securing means 122 to fix the engine block in position in the stand 10. In the preferred embodiment, the securing means 122 is simply a pair of bolt holes so that the user can utilize the existing mount holes in the engine block.

A collection box 123 is also mounted on the frame 12. The collection box 123 is used to collect parts removed from the engine 14, or for any other items as desired by the user.

The stand 10 further comprises a starter 16 so that the engine 14 can be started while it is in the stand 10. The starter 16 is mounted via pillow blocks 161 to the frame 12. The starter ring gear 162 is in communication with the engine 14 via a drive belt or it chain 163. The drive belt or chain 163 is connected to a drive pulley or sprocket 164 on the engine 14. A tightener 165 is used to remove any excess slack from the drive belt or chain 163.

Electrical power is supplied to the starter mechanism and to the engine by a battery 18 installed in a battery mount 181 that is affixed to the frame 12. The electrical power is used to drive the starter 16 and to power a pair of ignition coils 20 that are also mounted on the frame 12.

To supply fuel and oil to the engine, a fuel reservoir 22 and an oil reservoir 24 are mounted on the frame 12. A throttle 221 regulates the flow of gasoline from the fuel reservoir. A remote oil filter 241 maintains the cleanliness of the oil as the engine 14 is operated on the stand 10.

Figure 5:
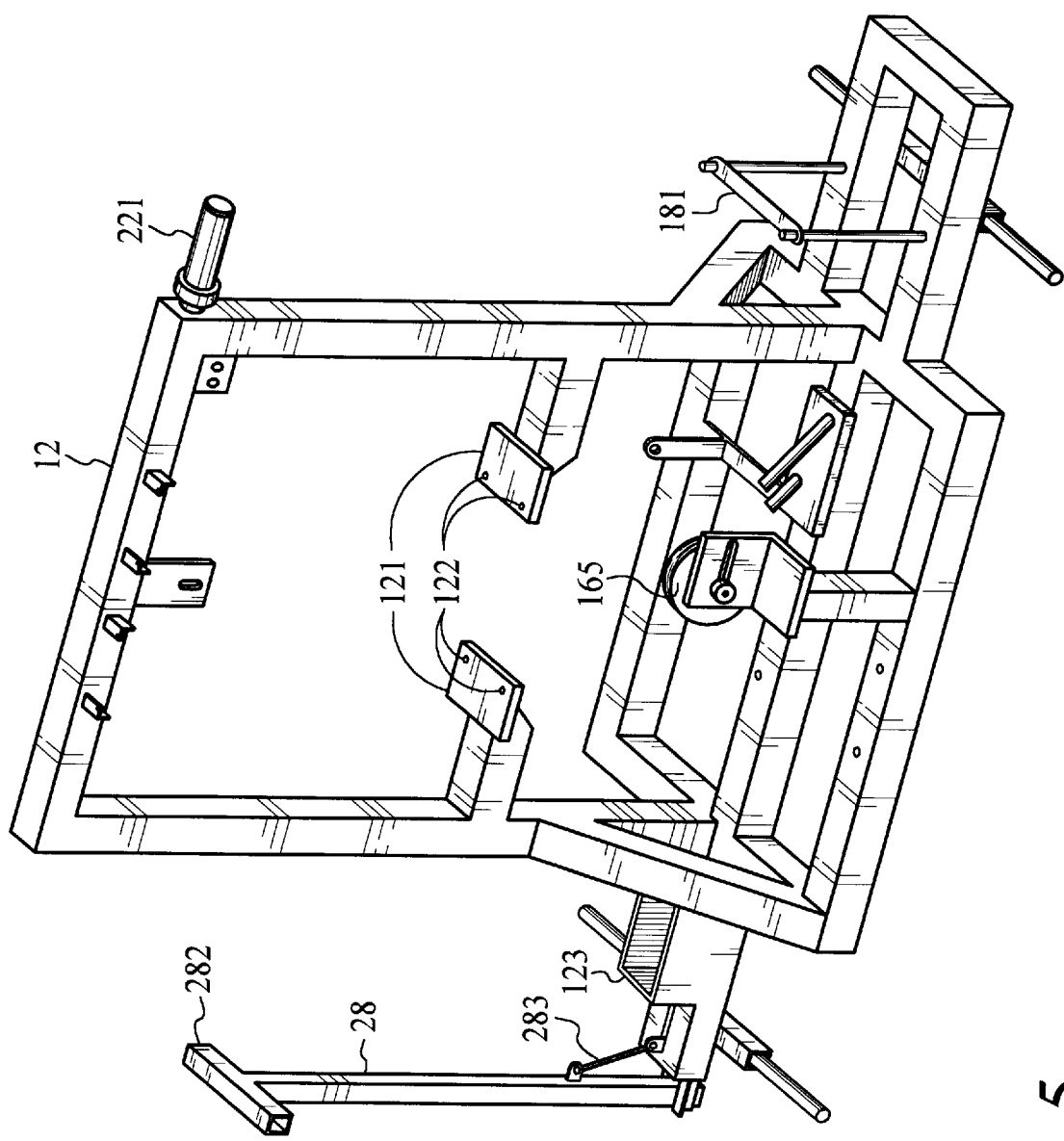
FIG. 5 is a left side perspective view of the frame of the stand.

To ensure easy portability for the stand 10, the frame 12 is mounted on wheels 26. Referring now to FIG. 5, a pull handle 28 is provided on the frame 12. The pull handle 28 comprises a longitudinal section 281 and a transverse section 282 that serves as the gripping area. A spring 283 affixed between the longitudinal section 281 and the frame 12 provides a tension force that urges the handle 28 toward an upright position. This minimizes the space required for the stand 10 when the stand 10 is in a stationary position. It also ensures that the pull handle 28 is always in a position in which it can be easily grasped by a user of the device.

Use of the portable engine stand 10 is generally as follows: The user pulls the stand 10 to a convenient location to move an engine 14 to be worked on into the stand from the motorcycle or from a storage area. The engine 14 is secured in the stand 10 on the engine mounts 121. The engine 14 can then easily be moved to the work area of the user.

When the user wants to operate the engine 14 for testing or for diagnostic purposes, the user needs only to make certain that the engine 14 is connected to the starter 16, and that fuel and oil are in the reservoirs 22, 24. The user then simply activates the starter 16, and the engine 14 either starts or displays the problem that needs to be fixed. Since a throttle 221 is supplied to control fuel flow, the engine 14 can be operated at any RPM range required.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. A portable engine stand comprising:

a frame that includes at least two engine mounts adapted to receive an engine, said engine mounts each include securing means to affix the engine to said engine mounts, a starter means, said starter means includes a starter ring gear adapted to communicate with the engine via a starter drive means, said starter drive means is adapted to turn an engine drive means on the engine, a battery to supply electrical power to said starter means, ignition coils adapted to be in electrical communication with the engine, said ignition coils receive electrical power from said battery, a fuel reservoir to supply fuel to the engine, and an oil reservoir to supply oil to the engine; such that said engine stand is adapted to secure said engine to facilitate maintenance and repair, and while said stand is adapted to start and operate the engine.

2. The portable engine stand of claim 1 wherein:

said frame is mounted on wheels for easy mobility.

3. The portable engine stand of claim 2 wherein:

a pull handle is affixed to said frame to facilitate moving said stand.

4. The portable engine stand of claim 3 wherein:

a spring is affixed between a longitudinal section of said pull handle and said frame to provide a tension force that urges said pull handle toward an upright position to minimize space required for said stand when said stand is in a stationary position.

5. The portable engine stand of claim 1 wherein:

a first one of said engine mounts is placed at a position lower that a second of said engine mounts.

6. The portable engine stand of claim 1 wherein:

a throttle is provided to regulate a flow rate of fuel from said fuel reservoir to the engine.

7. The portable engine stand of claim 1 wherein:

a remote oil filter is provided to clean oil flowing through said oil reservoir.

8. The portable engine stand of claim 1 wherein:

a collection box is provided to hold engine parts.

9. A portable engine stand comprising:

a frame that includes at least two engine mounts adapted to receive an engine, said engine mounts each include securing means to affix the engine to said engine mounts, said frame is mounted on wheels for easy mobility, a pull, handle is hingedly affixed to said frame to facilitate moving said stand, a spring is affixed between a longitudinal section of said pull handle and said frame to provide a tension force that urges said pull handle toward an upright position to minimize space required for said stand when said stand is in a stationary position, a starter means, said starter means includes a starter ring gear adapted to communicate with the engine via a starter drive means, said starter drive means is adapted to turn an engine drive means on the engine, a battery to supply electrical power to said starter means, ignition coils adapted to be in electrical communication with the engine, said ignition coils receive electrical power from said battery, a fuel reservoir to supply fuel to the engine, and an oil reservoir to supply oil to the engine; such that said engine stand is adapted to secure said engine to facilitate maintenance and repair, and while said stand is adapted to start and operate the engine.

10. The portable engine stand of claim 9 wherein:

a first one of said engine mounts is placed at a position lower that a second of said engine mounts.

11. The portable engine stand of claim 9 wherein:

a throttle is provided to regulate a flow rate of fuel from said fuel reservoir to the engine.

12. The portable engine stand of claim 9 wherein:

a remote oil filter is provided to clean oil flowing through said oil reservoir.

* * * * *